(12) United States Patent
Kubli et al.

(10) Patent No.: US 8,280,708 B2
(45) Date of Patent: Oct. 2, 2012

(54) CONFIGURATION OF TOOLS AND PROCESSES FOR METAL FORMING

(75) Inventors: Waldemar Kubli, Neerach (CH); Titus Zwickl, Winterthur (CH); Oliver Brühl, Lauchringen (DE)

(73) Assignee: Autoform Engineering GmbH, Neerach (CH)

( * ) Notice: Subject to any disclaimer, the term of this patent is extended or adjusted under 35 U.S.C. 154(b) by 359 days.

(21) Appl. No.: 10/556,920

(22) PCT Filed: May 14, 2004

(86) PCT No.: PCT/CH2004/000297
§ 371 (c)(1),
(2), (4) Date: Dec. 9, 2005

(87) PCT Pub. No.: WO2004/102291
PCT Pub. Date: Nov. 25, 2004

(65) Prior Publication Data
US 2006/0287755 A1 Dec. 21, 2006

(30) Foreign Application Priority Data
May 15, 2003 (CH) .................. 869/03

(51) Int. Cl.
*G06G 7/48* (2006.01)

(52) U.S. Cl. .................. 703/7; 703/1; 700/98
(58) Field of Classification Search .......... 703/1, 2, 703/6, 7
See application file for complete search history.

(56) References Cited

U.S. PATENT DOCUMENTS

| 5,150,457 | A | * | 9/1992 | Behm et al. .................. 345/420 |
| 5,377,116 | A | | 12/1994 | Wayne et al. |
| 5,463,558 | A | | 10/1995 | Tang et al. |
| 5,729,462 | A | | 3/1998 | Newkirk et al. |
| 6,035,242 | A | | 3/2000 | Uemura et al. |
| 6,349,467 | B1 | * | 2/2002 | Karafillis et al. .......... 29/890.01 |
| 6,353,768 | B1 | * | 3/2002 | Karafillis et al. .......... 700/97 |

(Continued)

FOREIGN PATENT DOCUMENTS

DE  195 00245 A1  8/1995

(Continued)

OTHER PUBLICATIONS

Joachim Danckert, "Experimental and FEM Analysis of a Combined Deep Drawing and Ironing Process", Jan. 2002, Aalborg University, pp. 1-53.*

(Continued)

*Primary Examiner* — Mary C Jacob
(74) *Attorney, Agent, or Firm* — Rankin, Hill & Clark LLP

(57) ABSTRACT

In a method, a data processing system and a computer program for the configuration of tools and/or processes for the manufacturing of formed metal parts, raw data (r) for the description of a geometry and of a condition of a formed metal part are calculated from a set of nominal simulation parameters (d,n) through the simulation of a metal forming process. From a set of nominal simulation parameters (d,n) in a simulation run a set of raw data is calculated and saved, the preceding step is repeated several times with a variation of the simulation parameters (d,n), and as a result of this further sets of raw data (r) are generated and saved, and a statistical analysis (10) of several or of all the saved sets of raw data (r) is carried throughout for the purpose of calculating statistical characteristic values (Cr) of the raw data (r).

12 Claims, 1 Drawing Sheet

U.S. PATENT DOCUMENTS

| | | | |
|---|---|---|---|
| 6,522,979 B1 | 2/2003 | Yavari et al. | |
| 6,636,862 B2* | 10/2003 | Lundahl et al. | 1/1 |
| 6,980,939 B2* | 12/2005 | Dhir et al. | 703/7 |
| 7,016,825 B1* | 3/2006 | Tryon, III | 703/6 |
| 7,158,922 B2* | 1/2007 | Sadagopan et al. | 703/2 |
| 2003/0004679 A1 | 1/2003 | Tryon, III et al. | |
| 2003/0009317 A1 | 1/2003 | Dhir et al. | |

FOREIGN PATENT DOCUMENTS

| | | |
|---|---|---|
| EP | 0 902 344 A2 | 3/1999 |

OTHER PUBLICATIONS

D. Bauer and R. Leidolf, "Design of Experiments, a Statistical Method to analyse Sheet Metal Forming Defects effectively", 1995, Elsevier Science B. V., pp. 187-201.*

K. Domkin, "Forming Limit Diagrams", Feb. 2000, Dalarna University College, pp. 1-4.*

Min Hu et al., "Simulation and analysis of assembly processes considering compliant, non-ideal parts and tooling variations", 2001, Elsevier Science Ltd., pp. 2233-2243.*

Andrzej Sluzalec, "Simulation of stochastic metal-forming process for rigid-viscoplastic material", 2000, Elsevier Science Ltd., pp. 1935-1946.*

A. Erman Tekkaya, "State-of-the-art of simulation of sheet metal forming", 2000, Elsevier Science Ltd., pp. 14-22.*

Osman Balci, "Guidelines for Successful Simulation Studies", 1990, Proceedings of the 1990 Winter Simulation Conference, pp. 25-32.*

S.W. Lee et al., "An assessment of numerical parameters influencing springback in explicit finite element analysis of sheet metal forming process", 1998, Elsevier Science S.A., Journal of Materials Processing Technology, pp. 60-67.*

Rajiv Suri et al., "Variation Modeling for a Sheet Stretch Forming Manufacturing System", 1999, Annals of the CIRP, pp. 397-400.*

Jerry Banks, ed.; "Handbook of Simulation"; 1998; John Wiley & Sons, Inc.; pp. 3-51.*

Arul M. Britto, "Running ABAQUS 6.3", Dec. 2003, pp. 1-34.*

Hibbard et al, "The VIS-5D System for Easy Interactive Visualization", Proceedings of the First IEEE Conference on Visualization, pp. 28-35, 1990.*

Miller et al, "The Practical Use of Simulation in the Sheet Metal Forming Industry", Confederation of British Metalforming Technical Conference, 2001.*

Sellgren, Ulf, "Aspects of Simulations in Product Development", Endrea-17, Simulation in Product Development, The Swedish Engineering Design Research and Education Agenda, Editor. S. Andersson, pp. 1-20, 2001.*

Wang et al, "Research on Applying One-Step Simulation to Blank Design in Sheet Metal Forming", Journal of Materials Processing Technology, 120, pp. 111-114, 2002.*

Stolte et al, "Polaris: A System for Query, Analysis and Visualization of Multidimensional Relational Databases", IEEE Transactions on Visualization and Computer Graphics, vol. 8, No. 1, Jan.-Mar. 2002.*

Hermann, M., et al., "Process Simulation of Metal-Forming Processes: Some Examples", Annals of the CIRP, vol. 40, Jan. 1991, pp. 285-289, XP002079417.

Rzesnitzek, Tim, et al.; "Two-Stage Stochastic and Deterministic Optimization"; LS-DYNA Forum Sep. 20, 2002; Jun. 27, 2003; pp. 1-18; XP-002444865.

Guan, X.L., et al.; "Effect of response surface parameter variation on structural reliability estimates", Structural Safety 23; 2001; pp. 429-444; XP-002444866.

"Berechnung Von Ausfallwahrscheinlichkeiten"; Engineering Services CADFEM; Dec. 2002; p. 1; XP-002444867.

* cited by examiner

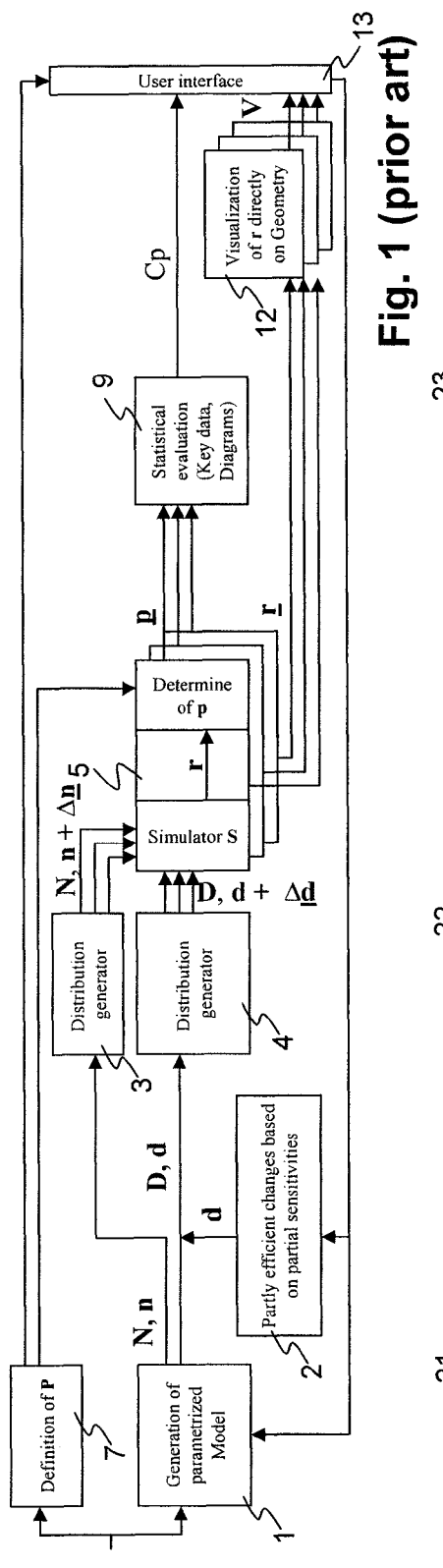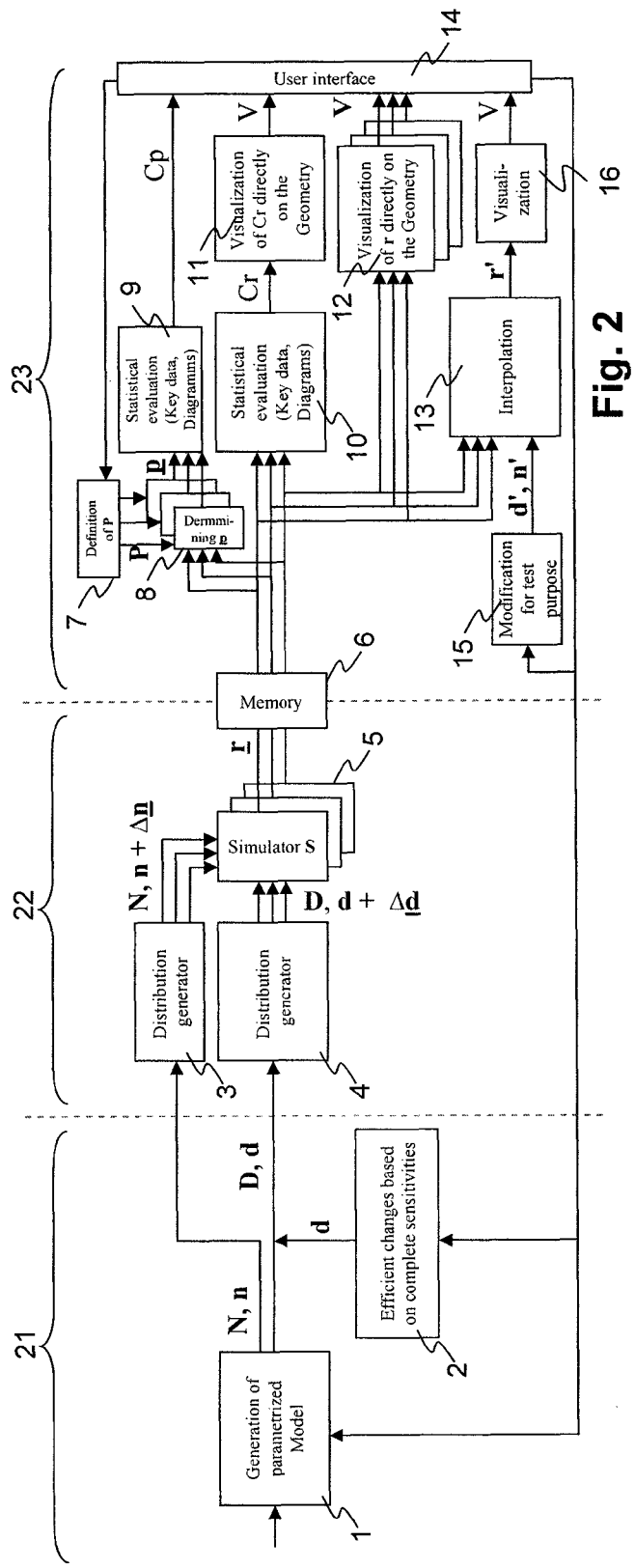

CONFIGURATION OF TOOLS AND PROCESSES FOR METAL FORMING

The invention is related to the field of configuring tools and/or processes for metal forming. It concerns a method, a data processing system and a computer program for configuring tools and processes for the manufacturing of formed metal parts, as well as to a data carrier.

STATE OF THE ART

Formed metal parts and in particular formed sheet metal parts as a rule are manufactured by deep drawing. The semi-finished products, so-called sheet metal mill bars, for this purpose are placed in multi-component forming tools. By means of presses, into which the sheet metal forming tools are inserted, the parts are formed. The parts as a rule are manufactured from a flat sheet metal mill bar in several forming stages, such as drawing, finish bottoming, adjusting, etc., this in combination with trimming steps.

For the configuration of metal forming tools, therefore, for example, male dies or stamps, bottom dies and sheet metal holders, as well as for the configuration of metal forming processes, therefore, for example, tool forces, drawing laths, lubrication, shape and material for the sheet metal mill bar, CAD/CAE (computer aided design/computer aided engineering) programs are utilized. These simulate, respectively, model a metal forming process by means of finite elements on the basis of simulation parameters. Simulation parameters one the one hand describe a geometry of the tools utilized in the metal forming process and on the other hand process parameters. Considered in the following as process parameters are various metal forming parameters, such as the lubrication, processing forces, etc., and also material parameters, such as the shape of the sheet metal mill bar, thickness, material characteristics, rolling direction, etc. The simulation programs create a description of the geometry of a sheet metal part after the forming process as well as the distribution of state variables, such as elongations and stresses in the formed sheet metal part. Simultaneously, they calculate certain characteristic values, called performance variables, which express a quality of the products.

For some years in doing so, stochastic simulations are also carried out, i.e., instead of a single simulation many simulations with statistically varied design parameters and statistically varied noise parameters or interference parameters are carried out. Design parameters are controllable simulation parameters, such as the geometry of the tools, interference parameters are non-controllable simulation parameters, such as variations in the sheet metal thickness and variations of the sheet metal material characteristics. Through the variation of these parameters it is possible to assess the robustness, that is, the sensitivity of the design versus parameter scatter and its controllability. This is important, because in reality, deviations from the simulation model always occur, for example, as a consequence of fluctuations in manufacturing processes, simplifications of the simulation model, numerical effects and non-linear effects. For the assessment and improvement of a design on the basis of the corresponding simulation results, nowadays the performance variables are defined prior to the simulation and prior to the stochastic analysis.

FIG. 1 schematically illustrates a data flow during the designing of metal forming tools and of metal forming processes in accordance with the state of the art. In this, a definition of performance variables 7 is carried out in conjunction with a model generation 1. Simulation parameters d,n from the model generation 1 are brought to a simulator 5, which for varying simulation parameters d,n, respectively calculates raw data r and performance variables p. The raw data r are visualised in a depiction of the raw data 12 on a 3D-model of the formed part in a colour contour representation. Out of the performance variables p, in a statistical evaluation 9, characteristic values Cp of the performance variables p are calculated. Together with the design parameters and the interference parameters, the performance variables and the characteristic values Cp are typically depicted in diagrams, e.g., in scatter-plots, histograms, correlation diagrams, etc.

The evaluation of stochastic simulations is not very graphically vivid today. Because only individual performance variables are available, local information at certain geometrical places of the system is frequently lacking. Because the performance variables have to be defined prior to the stochastic analysis, during the evaluation, frequently, performance variables are lacking, the necessity of which is only identified during the evaluation. In order to obtain these, the elaborate simulations and the stochastic analysis have to be carried out once more. The depiction of the performance variables in diagrams is indirect and therefore abstract and calls for a great power of imagination. These disadvantages contribute to the fact that stochastic simulations today are still carried out only very infrequently.

DESCRIPTION OF THE INVENTION

It is therefore the objective of the invention to create a method, a data processing system and a computer program for the configuration of tools and/or of processes for the manufacturing of formed metal parts of the kind mentioned at the beginning, which eliminate the disadvantages mentioned above.

This objective is achieved by a process, a data processing system and a computer program for the configuration of tools and/or of formed metal parts with the characteristics of the corresponding independent claims.

Therefore raw data are saved in every calculation point of the simulation model. The calculation points usually are integration points and nodes or nodal points of a finite element (FE) model. The raw data are direct results of the simulation of the metal forming process. They describe, for example, the geometry of the formed metal part, the distribution of the sheet metal thickness, elongations or stresses in the formed material, the distribution of fracturing criteria, the displacement distribution as a result of resilience or spring-back after the removal from the tool, etc. The raw data, therefore, respectively describe local values for a multitude of points of the simulation model, preferably, for all points of the simulation model. The simulation, for example, is an accurate incremental simulation of the complete metal forming process, or a simple assessment of the formability, based, e.g., on a single step process.

The simulation, departing from nominal simulation parameters, is repeated for simulation parameters varied slightly around these, and the raw data produced are once again stored in memory. In this manner, several sets of raw data are calculated. The calculation time for the multitude of simulation runs required amounts from several hours up to several days.

From these saved raw data, for every set of raw data corresponding performance variables are calculated. In order to obtain comparable performance variables from the individual simulations, the raw data of the individual simulations are assigned to one another, for example, in that calculation points that are spatially equal or located closest together are assigned to one another. The evaluation therefore in preference refers to spatially fixed points (this in contrast to points fixed with respect to material). With this, any, for example, also adaptively adapted calculation grids, which represent the same object in different simulation runs, are capable of being brought into reference with one another, respectively, spatially fixed points from different simulations are capable of being assigned to one another. In doing so, it is also possible to select one of the simulations as reference simulation, to which the other simulations are referred.

Performance variables characterize certain interesting characteristics of the formed metal part, and performance variables allow an assessment of a quality of the part, respectively, of the metal forming process. Performance variables preferably refer to individual points or to individual zones of the part having predefined spatial dimensions. Thus, for example, a performance variable characterizes an extreme value or an average value of a predefined model characteristic or of raw data within a zone of this type. Performance variables, for example, describe a maximum thinning out of the sheet metal in a certain zone of the sheet metal subject to the danger of fracturing, a minimum flattening in a certain weakly deformed zone of the sheet metal, a maximum displacement as a result of resilience or spring-back in the zone of a flange of a part, a necessary stamp force, etc.

Thus, several sets of performance variables are generated. These are statistically evaluated, in that, for example, average values, scattering, etc., of the performance variables or sensitivities, correlations, etc., of the performance variables versus the design parameters and interference parameters are determined.

In accordance with the invention, now however, also the saved raw data are statistically evaluated. In doing so, in every calculation point the raw data of the individual simulations are assigned to one another, e.g., as mentioned above through minimum spatial distances, and statistical characteristic values of the raw data are determined, such as, for example, average values, scattering, sensitivities, correlations, etc. Certain ones of these characteristic values are superimposed on a visualisation of a 3D-model of the formed part. This takes place, for example, in a colour contour depiction by colouring the model in every point of the part, respectively, of its surface in accordance with one or several of the statistical characteristic values in this point. Thus, for example, it is also possible to directly depict process capability characteristic values, such as Cp and Cpk-values according to DIN 55319 by means of colour contours on the geometry. Alternatively to this, it is also possible to depict the characteristic values superimposed on a 3D-model of another object involved in the metal forming process, for example, of the geometry of a part prior to the metal forming, or of the tool geometry. The evaluation of the stochastic analysis as a result of this becomes vividly clear and more simple. For example, scattering, and with this the robustness, of individual target values become immediately identifiable and localizable. As a result, also the zones of influence of individual parameters are immediately vividly clear. It is possible, for example by means of a coloured depiction of a scatter dimension of the sheet metal thickness in the formed metal part to immediately identify, whether and where zones exist, which react with little robustness to fluctuations of the design parameters and interference parameters. It is even possible, for example, to depict on the geometry in coloured form as a statistical value the percentage frequency, with which a given minimum thickness is locally fallen below, which makes possible the easy and immediate identification of zones which do not fulfil certain manufacturing tolerances anymore. If now, for example, a statistical measure of the correlation or of the sensitivity of the sheet metal thickness versus a design parameter is depicted in colour on the complete geometry, it is immediately possible to identify, whether with this design parameter desired improvements are capable of being achieved at the critical points and which remaining zones as a result would also be, possibly negatively, influenced. In the case of all these analyses, as a result of the depiction of the statistical characteristic values on the complete geometry, one is not anymore dependent on the correct selection of individual performance variables at the right points of the geometry, in order to identify a local problem. In particular in the case of complicated formed metal parts it is almost impossible and exceedingly time-consuming to record all problem zones with respect to robustness and all influence zones of the design parameters and interference parameters with the help of individual performance variables, which makes elaborate stochastic simulations strongly questionable and which has led to the fact that these up to now have not been utilized as a standard method. Only the depiction on the complete geometry renders it possible to identify with certainty all problem zones in a formed metal part and to record the influence zones and consequences of individual simulation parameters completely. As a result of this, stochastic simulations provide significantly more useful evidence, and the number of slow iteration stages, that is, of a complete new simulation for the robust configuration of a model can be significantly reduced.

In a preferred embodiment of the invention the performance variables are calculated in an interactive process and displayed to a user. Thus, for example, a user with a pointing means, such as a computer mouse, selects a point or a zone of a depiction of a formed metal part. In correspondence with the selected point a performance variable, such as, e.g., a local minimum thickness is defined. Other performance variables are, for example, a thickness histogram or a sensitivity with respect to one or several design parameters. From this definition, on the basis of the saved raw data, corresponding statistical characteristic values are calculated and displayed in graphic form. For example, a bar chart of the kind of a "box plot" moved along with a mouse pointer or arranged in a certain zone of the monitor screen illustrates the material thickness of the nominal solution together with the simulated variation of the material thicknesses respective to the selected point. Or else a sensitivity of a parameter in the selected point is illustrated with respect to several design parameters, for example, in the form of a pie chart. By moving the pointing device, it therefore is possible to obtain an overview over the different influences and sensitivities rapidly.

In a further preferred embodiment of the invention for each or for a subset of the sets of raw data, a forming limit diagram is created and displayed for a user. In it, elongation states for individual calculation points respectively are depicted as points in a two-dimensional illustration. For the set of the calculation points of a set of raw data r, a cloud of points results, which provides an overview over the elongation stress of a part. A forming limit curve is drawn into the same depiction. It delimits a zone, within which the material elongation leads to tearing or fracturing. As an extension of the forming limit diagram, the clouds of points of several sets of raw data are depicted superimposed on one another. As a result it becomes visible, how the probability of a material tear or fracture behaves in the case of a variation of the simulation parameters. In place of clouds of points it is also possible to create and to display visual characteristics, which characterize these clouds of points, for example, the main axes of an ellipse approximating a cloud of points. Preferably, the frequency of individual zones of the combined clouds of points are made visible by means of a three-dimensional depiction or a depiction with colours, in that, for example, the frequency is plotted in the third dimension in a similar manner to a histogram.

In a combination of this depiction with the interactive process mentioned above, after the selection of a point in the depiction of the formed metal part, the corresponding nominal point and/or the corresponding statistically distributed cloud of points is visually emphasised in the forming limit diagram, for example, by changing the colour or the brightness of the points. Vice-versa, following the selection of a zone in the forming limit diagram it is possible to visually emphasise the corresponding zones on the formed metal part.

In practical work with a design system, the problem frequently occurs, that the designer recognises after the simulation that a certain zone of the material might manifest problems of a certain kind. In order to be able to quantify these problems, he has to define a corresponding performance variable that allows an assessment of the problem. Thus, for example, he defines the maximum resilience or spring-back of a flange of a part as performance variable, in order to assess how strongly this value is scattered as a result of the variation of the interference parameters, and therefore how robust or reproducible this value is versus fluctuations of this type, and with which design parameter this value is correlated, i.e., through which design parameter the spring-back is best able to be controlled, resp., corrected.

The new performance variable or a modified performance variable now does not have to be determined in a complete stochastic analysis with a multitude of simulation runs. Instead, the new performance variable is in each case calculated repeatedly from each one of the saved sets of raw data. The several values of the performance variable obtained in this way, which vary between one another, are statistically analysed and optionally depicted in graphical form. It is therefore possible to very rapidly define varying and new performance variables and to calculate their values, without it being necessary to repeat the elaborate simulations of the metal forming process.

The design process for the user therefore consists of two separate iteration loops: In a slow iteration loop, stochastic simulations are carried out on the basis of iteratively improved models, and raw data are calculated. In a more rapid iteration loop, the raw data are analysed and iteratively the performance variables for the characterisation of the model under observation are improved. Thanks to the existence of the more rapid iteration loop, on the one hand it is possible to detect the weak points of the design more quickly and on the other hand through the rapid adaptation possibility and new calculation of the performance variables one is capable of investigating critical points in a purposeful manner. Thus, for example, within a zone of material, in which one at the beginning of the design did not anticipate any problems, it is possible that one establishes during the analysis of the raw data, that between some simulations the thickness fluctuates strongly. Through the definition of the minimum thickness in this zone as a performance variable and through the calculation of its scatter, one now is immediately in a position to assess, whether these fluctuations are still within given manufacturing tolerances. If this is not the case, therefore if, e.g., a lower thickness limit is fallen below with too high a frequency, then through the evaluation of the correlation with the performance variables versus the design parameters, e.g., the retaining effect of the drawing laths, it is possible to immediately establish, with which drawing lath the thickness is capable of being influenced best. Further performance variables may now be defined, in order to investigate, whether changes to the design parameters established in this manner cause unfavourable effects at other points, e.g., a too little flattening down of the sheet metal in other zones. With this procedure explained here by manner of an example, it is possible during the evaluation in the rapid iteration loop to make the correct changes to the model with a high degree of certainty, in order to improve the model with respect to the desired quality of the formed metal part and with respect to its robustness; as a result, the number of the slow iteration loops is significantly reduced.

In a further preferred embodiment of the invention, from the raw data, if so required, individual further sets of raw data, which have not explicitly been calculated in one of the repeated simulation runs, are determined through interpolation. Thus, for example, the stochastic analysis manifests that a solution in accordance with a certain combination of parameters could well be of interest. Instead of a simulation run for this parameter combination, the complete corresponding solution, that is, geometry and material condition following the forming process, are established through interpolation from the saved sets of raw data. In this manner it is possible to verify a certain parameter set, respectively, the corresponding solution very rapidly and with a low calculation effort. It is not necessary anymore to wait hours for a test-wise evaluation.

The data processing system for the configuration of tools and processes for the manufacturing of formed metal parts comprises storage means with computer program code means saved thereon, which describe a computer program, as well as data processing means for the execution of the computer program, wherein the execution of the computer program leads to the implementation of the method in accordance with the invention.

The computer program for the configuration of tools and processes for the manufacturing of formed metal parts in accordance with the invention is capable of being loaded into an internal memory of a digital data processing unit and it comprises computer program code means, which, when they are executed in a digital data processing unit, cause this data processing unit to execute the method in accordance with the invention. In a preferred embodiment of the invention a computer program product comprises a data carrier, namely, a computer readable medium, on which the computer program code means are saved.

BRIEF DESCRIPTION OF THE DRAWINGS

In the following, the object of the invention is explained in more detail on the basis of a preferred example of an embodiment, which is illustrated in the attached drawings. These illustrate:

FIG. 1 schematically shows a data flow during the designing of metal forming tools and metal forming processes in accordance with the state of the art; and FIG. 2 schematically shows a data flow and a sequence structure of a method in a preferred embodiment of the invention.

The reference marks utilized in the drawings and their significance are listed in summary in the list of reference marks. On principle, in the Figures the same components are identified with the same reference marks.

METHODS FOR THE IMPLEMENTATION OF THE INVENTION

FIG. 2 schematically illustrates a data flow and a sequence structure of a method in a preferred embodiment of the invention. The sequence is preferentially implemented by means of a computer program, which is executed on a data processing system.

By means of a model generator 1, a model structure and nominal model parameters are generated on the basis of data from a file or from a user interface. These preferably are parameterized facet data or surface data for the description of the geometry of the metal forming tools, parameterized curve data for the description of the shape of sheet metal mill bar, of drawing lath courses and other model curves, as well as characteristic values for the description of a metal behaviour, of the friction, of drawing laths and of other process parameters.

The model structure and model parameters are the basis for a simulator 5 and for this reason are designated in summary as nominal simulation parameters d,n. From their type, the simulation parameters d,n are split-up into design parameters d and interference parameters n. The design parameters d comprise controllable parameters such as the geometry parameters of the metal forming tools, the geometry parameters of the sheet metal mill bar, the sheet metal holder forces, the drawing lath forces, the lubrication, etc. The design parameters d therefore describe tools and process characteristics. In doing so, in accordance with the terminology of the application presented here also controllable parameters of the formed material, therefore, for example, the shape and material of a piece of sheet metal, are also considered as process parameters. The design parameters d are capable of being modified by a means for the parameter modification 2, for example, a user interface. Definitions D of the design parameters d and definitions N of the interference parameters n respectively include a description of the corresponding parameters, for example, a rule as to how the parameter value contributes to the construction of the model. For example, a given rounding value at a certain point is transformed into a modification of surfaces at this point. The description may also be a verbal description as an aid for the user, or a characterisation of tolerances of the parameters.

Interference parameters n comprise non-controllable parameters, which, e.g., are subject to manufacturing tolerances or non-modelled influences, such as the sheet metal thickness, the material characteristics, the friction, not accurately adjustable sheet metal holder forces, geometrical parameters of the tools not subject to wear, etc. Depending on the problem set, it is possible that a certain parameter is considered as a design parameter or as an interference parameter.

On the basis of the simulation parameters d,n, a solver or simulator 5 calculates raw data r, which describe the geometry and further characteristics of the formed metal part produced. The further characteristics describe in particular a condition of the formed metal part, such as elongations and stresses in the formed metal sheet and values derived from these, such as sheet metal thickness, failure criteria, etc.

A multitude of simulation runs are carried out with the simulator 5, wherein the design parameters d and the interference parameters n respectively are varied by an assigned parameter variation of the interference parameters 3, respectively by a parameter variation of the design parameters 4, by, as a rule, small values $\Delta d$, respectively, $\Delta n$ in accordance with predefined statistical characteristic values. The variation, preferably, takes place according to a stochastic or Monte-Carlo-procedure. In another embodiment of the invention, a deterministic procedure is utilized. In doing so, parameters are systematically varied around their nominal value, in order to obtain a maximum amount of information with a minimal number of parameter combinations.

For every simulation run a set of raw data r is generated. A totality of all sets of raw data r is saved in a memory 6. In the subsequent procedural steps first of all the raw data r themselves are depicted as usual are depicted on a geometry of the formed metal part, for example, in a colour contour representation. This, for example, takes place by means of a user interface to the model analysis 14 with a projection of the calculated 3D-model on to a monitor screen or on to a printout. As a second step, a statistical evaluation of the raw data 10 is carried out, which individually determines statistical characteristic values Cr of the raw data r for every geometrical point of the simulation. For this purpose, a geometrical assignment of the raw data of the individual simulations to one another is required, which for example, is accomplished through the minimum distance. The characteristic values Cr are also depicted on a geometry of the formed metal part by means of a depiction of statistical characteristic values of the raw data 11. In principle it is of course also possible to only make use of a sub-set of all raw data r in the statistical evaluation.

As a third step, from the raw data r by means of steps, respectively, by means of modules for the calculation of performance variables 8, the performance variables p for several and preferably for each one of the saved sets of raw data r are calculated. The calculation takes place on the basis of definitions P of the performance variables p. The definitions P contain calculation prescriptions for the calculation of the performance variables p from the raw data r, for example, in the form of program code. The performance variables p on their own already allow to make a statement concerning the characteristics and in particular concerning the quality of the formed metal part. The statement, however, is significantly more valuable, if it takes statistical characteristic values Cp of the performance variables into consideration. These characteristic values Cp take into account the totality or a sub-set of the variations of the performance variables p, such as it results from the totality or from a sub-set of the raw data r in correspondence with the variations 3, 4 of the simulation parameters d,n. The individual performance variables p and respectively assigned statistical characteristic values preferably are made available to the user in the form of a tabulation and/or in the form of suitable graphic depictions V through the user interface for the model analysis 14.

The user interface for the model analysis 14 makes possible an establishment or a modification of definitions of performance variables 7. A re-calculation of new, respectively, changed performance variables p of this kind is possible immediately on the basis of the saved raw data r, without it being necessary to carry out the very elaborate simulation 5 with varying simulation parameters d,n once more. The statistical characteristic values Cp of the performance variables are also capable of being determined immediately. This corresponds to a rapid iteration loop of the design procedure.

The user interface for the model analysis 14 also makes possible a changing of the model structure and of the design parameters d, as is indicated with an arrow to the model generator 1 and the parameter modification 2. This corresponds to a slow iteration loop of the design procedure. It is of course also possible to carry out a modification of the model structure and of the design parameters d by means of a separate user interface.

In a preferred embodiment of the invention, if so required for certain "new" simulation parameters d', n', for which no solution, namely, raw data r have been determined yet, a corresponding new solution r' is sought. The new simulation parameters d', n' are determined in a modification for test purposes 15. The new solution r' is determined through an interpolation 13 from the raw data r. For this purpose, standard procedures, such as, for example, a Response Surface method, are utilized. The new solution r' and its characteristic values, for example, are depicted through geometry and material condition following the metal forming process 16.

The interpolation is also able to take place indirectly, in that correlations between simulation parameters d,n and solution data are determined, wherein here with the term "solution data" raw data and/or performance variables are designated. Correlations of this type may also be considered as sensitivities of the solution data with respect to the simulation parameters d,n. These sensitivities essentially correspond to partial derivations of the solution data with respect to the simulation parameters d,n around a reference solution, and they are determined through a stochastic analysis. On the basis of known sensitivities, now a rapid re-calculation and depiction of solution data of an approximating solution in the vicinity of the reference solution are possible. For this purpose, for example, a graphic user interface with control elements is generated, with which control elements respectively individual simulation parameters are capable of being interactively varied by a user, and the effect on selected solution variables or quantities of solution variables is immediately graphically displayed in a depiction of parts or in another kind of depiction.

Corresponding to the simulation parameters d,n, for which the results of the simulations and in particular of the stochastic analysis of the raw data r are satisfactory and/or are optimised through the iteration, the tools for the metal forming process are manufactured and the metal forming process is carried out.

A software system in accordance with the invention comprises a pre-processor unit 21, a solver unit 22 and a post-processor unit 23. The pre-processor unit 21 comprises a model generator 1 and a program module, respectively, means for the parameter modification 2. The solver unit 22 comprises program modules for the parameter variation of the interference parameters 3 and of the design parameters 4, and for the simulator 5. The post-processor unit 23 preferentially comprises program modules for the calculation of performance variables 8, the statistical evaluation and optional depiction of performance variables 9, the statistical evaluation of raw data 10, the depiction of statistical characteristic values of the raw data 11, and the depiction of the raw data 12.

The solver unit 22 and the post-processor unit 23 comprise program means for the access to the jointly utilized memory 6 for saving the raw data r.

LIST OF REFERENCE MARKS

1 Model generator
2 Parameter modification
3 Parameter variation of the interference parameters
4 Parameter variation of the design parameters
5 Simulator (Solver)
6 Memory
7 Definition of performance variables
8 Calculation of performance variables
9 Statistical evaluation/analysis of performance variables
10 Statistical evaluation of raw data
11 Depiction of statistical characteristic values of the raw data
12 Depiction of the raw data
13 Interpolation
14 User interface for the model analysis
15 Modification for test purposes
16 Depiction
21 Pre-processor unit
22 Solver unit
23 Post-processor unit

The invention claimed is:

1. A data processing system for simulating at least one of tools and processes for manufacture of formed metal parts, wherein the data processing system comprises:
a simulator and memory for implementing a method for simulation of a least one of tools and processes for manufacturing of formed metal parts and for providing statistical information on the simulation results, in which, from a set of nominal simulation parameters (d,n) through simulation of a metal forming process, raw data (r) for description of a geometry and of a condition of a formed metal part are calculated, the raw data (r) describing a geometry and a condition of a formed metal part in calculation points of a finite element model, the method for simulation including the steps of:
calculating and saving through simulation of the metal forming process a set of raw data from the set of nominal simulation parameters (d,n) in a simulation run (5) and storing the set of raw data in the memory, the raw data (r) describing local values of the condition of the formed metal part in a multitude of calculation points which are integration points or nodal points of the finite element model,
repeating the step of calculating and saving through simulation of the metal forming process more than two times, with variation of the simulation parameters (d,n) around the nominal simulation parameters (d,n), so as to generate and save further sets of raw data (r), the raw data (r) describing local values of the condition of the formed metal part in a multitude of the calculation points,
statistically analyzing, for each of the multitude of the calculation points, a plurality of the saved sets of raw data (r) and thereby calculating statistical characteristic values (Cr) of the raw data (r) for the multitude of calculation points, and
associating each statistical characteristic value (Cr) with a point of the geometry of the formed metal part,
generating a visual depiction of at least one of the statistical characteristic values (Cr) of the raw data (r) on a visual depiction of an object involved in the metal forming process,
wherein the step of statistically analyzing a plurality of the saved sets of raw data (r) comprises the steps of:
assigning, for the calculation points, the raw data of the individual simulations to one another by assigning calculation points that are at the same location in space or are located closest together to one another,
determining the statistical characteristic value of the raw data by statistically evaluating the raw data of the calculation points that are assigned to one another.

2. A method for simulating by means of a computer at least one of tools and processes for the manufacturing of formed metal parts and for providing statistical information on the simulation results, in which,
from a set of nominal simulation parameters (d,n) through simulation of a metal forming process raw data (r) are calculated,
the raw data (r) describing a geometry and a condition of a formed metal part in calculation points of a finite element model, and the raw data (r) thereby describing local values of the condition of the formed metal part in a multitude of calculation points which are integration points or nodal points of the finite element model,
the method comprising the steps of:
calculating and saving through simulation of the metal forming process a set of raw data (r) from the set of nominal simulation parameters (d,n) in a simulation run and storing the set of raw data in computer memory, the raw data (r) describing local values of the condition of the formed metal part in a multitude of the calculation points, repeating the step of calculating and saving through simulation of the metal forming process more than two times, with variation of the simulation parameters (d,n) around the nominal simulation parameters (d,n), as to generate and save sets of raw data (r), the raw data (r) describing local values of the condition of the formed metal part in a multitude of the calculation points, and statistically analyzing for each of the multitude of the calculation points, a plurality of the saved sets of raw data (r) and thereby calculating statistical characteristic values (Cr) of the raw data (r) for the multitude of calculation points, associating each statistical characteristic value (Cr) with a point of the geometry of the formed metal part, generating a visual depiction of at least one of the statistical characteristic values (Cr) of the raw data (r) on a visual depiction of an object involved in the metal forming process, wherein the step of statistically analyzing a plurality of the saved sets of raw data (r) comprises the steps of:

assigning, for the calculation points, the raw data of the individual simulations to one another by assigning calculation points that are at the same location in space or are located closest together to one another, determining the statistical characteristic value of the raw data by statistically evaluating the raw data of the calculation points that are assigned to one another.

3. The method in accordance with claim 2, wherein in a further, separate step, from the sets of saved raw data (r) in an analysis run, generating an associated set each of performance variables (p) for characterising certain properties of the formed metal part for more than two of the sets of raw data (r), and statistically analyzing the sets of performance variables (p) and thereby calculating statistical characteristics (Cp) of the performance variables.

4. The method in accordance with claim 3, wherein a calculation procedure for determining at least one performance variable (p) is modified or newly established and, correspondingly, from the sets of saved raw data (r) modified or new performance variables (p) are calculated.

5. The method in accordance with claim 3 wherein a visual depiction of at least one of the performance variables (p) or of one of its statistical characteristic values (Cp) in combination with at least one other performance variable (p) or its statistical characteristic values (Cp) or design parameters (d) or interference parameters (n) or its predefined statistical characteristic values is generated.

6. The method of claim 3, wherein the performance variables refer to individual points of the part or to individual zones of the part having predefined spatial dimensions.

7. The method in accordance with claim 2, wherein the variation of the simulation parameters (d,n) is carried out according to a deterministic or a stochastic or a combined procedure.

8. The method in accordance with claim 2, wherein from a set of new simulation parameters (d', n') and the saved raw data (r) through interpolation a new set of raw data (r') is calculated.

9. The method in accordance with claim 2, wherein the simulation parameters (d,n) comprise design parameters (d) for describing controllable parameters of the tools and of the metal forming process and further comprise interference parameters (n) for describing non-controllable parameters of the tools and of the metal forming process.

10. The method in accordance with claim 2, wherein a forming limit diagram with a plurality of superimposed clouds of points or visual characteristics characterising a clouds of points is generated, wherein every cloud of points represents the strain in all or of at least one of the calculation points from one of the more than two sets of raw data (r).

11. The method in accordance with claim 2, wherein the steps mentioned are repeated several times for changed nominal simulation parameters (d,n).

12. The method in accordance with claim 2, wherein the object is one of the formed metal part, a part prior to the metal forming or the tool geometry.

* * * * *